US012187019B2

(12) United States Patent
Mannheim Astete et al.

(10) Patent No.: US 12,187,019 B2
(45) Date of Patent: Jan. 7, 2025

(54) AUTOMOTIVE GLAZING WITH ANTI-FINGERPRINT COATING

(71) Applicant: AGP America S.A., Ciudad de Panama (PA)

(72) Inventors: Mario Arturo Mannheim Astete, Lima (PE); Allan De Oliveira, Lima (PE); José Nuñez-Regueiro, Lima (PE); Massimo Michetti, Lima (PE); Eduardo D. Temoche, Lima (PE); Zhaoyu Wang, Lima (PE)

(73) Assignee: AGP America S.A., Panama (PA)

( * ) Notice: Subject to any disclaimer, the term of this patent is extended or adjusted under 35 U.S.C. 154(b) by 335 days.

(21) Appl. No.: 17/774,334

(22) PCT Filed: Nov. 5, 2020

(86) PCT No.: PCT/IB2020/060433
§ 371 (c)(1),
(2) Date: May 4, 2022

(87) PCT Pub. No.: WO2021/090242
PCT Pub. Date: May 14, 2021

(65) Prior Publication Data
US 2022/0402256 A1      Dec. 22, 2022

Related U.S. Application Data

(60) Provisional application No. 62/930,942, filed on Nov. 5, 2019.

(51) Int. Cl.
*B32B 15/04*       (2006.01)
*B32B 17/06*       (2006.01)
(Continued)

(52) U.S. Cl.
CPC ........ *B32B 37/02* (2013.01); *B32B 17/10036* (2013.01); *B32B 17/10981* (2013.01);
(Continued)

(58) Field of Classification Search
CPC . B32B 17/10036; B32B 2383/00; B60J 1/001
(Continued)

(56) References Cited

U.S. PATENT DOCUMENTS 11,618,507 B2 *   4/2023   Mannheim Astete .. B32B 17/10 296/214
2001/0031366 A1 *  10/2001   Terneu ................ C03C 17/2453 428/432
(Continued)

FOREIGN PATENT DOCUMENTS

| CN | 104220252 A | 12/2014 |
|---|---|---|
| CN | 106082712 A | 11/2016 |

(Continued)

*Primary Examiner* — Lauren R Colgan
(74) *Attorney, Agent, or Firm* — The Morales Law Firm; Joseph L. Morales, Esq.

(57) ABSTRACT

Due to the increased glazed area of modern vehicles, especially the large panoramic glass roofs, we have seen a substantial growth in the use of anti-reflective coatings. Unfortunately, these types of coatings accentuate fingerprints and smudges. The invention provides an automotive glazing which is substantially resistant to fingerprints, and a method of manufacture thereof through the application of an anti-fingerprint coating based on low surface energy silanes.

15 Claims, 7 Drawing Sheets

(51) Int. Cl.
  *B32B 17/10* (2006.01)
  *B32B 33/00* (2006.01)
  *B32B 37/02* (2006.01)
  *B32B 38/00* (2006.01)
  *B60J 1/00* (2006.01)
  *B32B 37/24* (2006.01)
(52) U.S. Cl.
  CPC .......... *B32B 33/00* (2013.01); *B32B 38/0036* (2013.01); *B60J 1/001* (2013.01); *B32B 2037/243* (2013.01); *B32B 2250/02* (2013.01); *B32B 2255/26* (2013.01); *B32B 2307/412* (2013.01); *B32B 2307/584* (2013.01); *B32B 2307/71* (2013.01); *B32B 2307/73* (2013.01); *B32B 2307/732* (2013.01); *B32B 2307/7376* (2023.05); *B32B 2309/025* (2013.01); *B32B 2383/00* (2013.01); *B32B 2605/006* (2013.01)

(58) Field of Classification Search
  USPC .................................................. 428/426, 432
  See application file for complete search history.

(56) References Cited

U.S. PATENT DOCUMENTS

2016/0002099 A1\* 1/2016 Manz ................ B32B 17/10036
                                                              427/160
2019/0225534 A1\* 7/2019 Fedullo ................ C03C 17/366

FOREIGN PATENT DOCUMENTS

| WO | 2018122769 A1 | 7/2018 |
| WO | 2019008471 A1 | 1/2019 |

\* cited by examiner

AUTOMOTIVE GLAZING WITH ANTI-FINGERPRINT COATING

FIELD OF THE INVENTION

This patent relates to the field of automotive glazing.

BACKGROUND OF THE INVENTION

A trend that has been growing in automotive design over the last several years has been an increase in the total area of the glazing. The increase in the glazed area is often accompanied by a reduction in vehicle weight due to the displacement of heavier materials. This has been a key part of the automotive strategy to meet regulatory requirements for higher fleet fuel efficiency as well as consumer demand for more environmentally friendly vehicles. Also, as automotive interiors have been getting smaller, the glazing area has been increased in an effort to offset the claustrophobic effect that can result from a reduction in cabin volume. The increase in vision area and natural light tend to give the cabin a more open and airier feel. As a result, large panoramic glass roofs have become a popular option on many models. In recent years, on models offered with a panoramic roof option in North American and Europe, the take rate has been in the 30% to 40% range. In China, the rate has been close to 100% on some models.

As glass roof systems typically have very low visible light transmission levels, any reflected interior light is much more noticeable do to the much lower transmitted to reflected light ratio. The application of and anti-reflective coating is a common solution to this problem.

However, fingerprints and smudge marks when they occur on a glass surface with an anti-reflective coating, AR, exhibit a high degree of contrast making the marks much more visually objectionable to the vehicle occupants than when they occur on the same glazing without an AR coating. This lessening of aesthetic appeal is undesirable, especially when occurring in combination with a premium feature such as a panoramic roof.

Anti-fingerprint, AF, (also known as anti-smudge) coatings are very common in applications such as touchscreens, as well as many other areas where hydrophobic/oleophobic treatment is desired. The anti-reflective coating is a layered coating deposited on the flat glass prior to forming via magnetron sputtering vapor deposition, chemical vapor deposition, physical vapor deposition or other methods know in the art.

Many patents describe anti-fingerprint coatings and methods of making the same, see e.g. U.S. Pat. No. 9,272,947B2, U.S. Ser. No. 10/233,333B2, U.S. Pat. No. 8,968,831B2, US2016/0035912 among others. However, the application of these types of coatings on large automotive glazings, especially curved parts is not practiced due to the problems resulting from the size and curvature of such parts. Adequate surface preparation, i.e. cleaning and activation as well as uniform application are difficult.

A glazing, which combines both an AR and an AF coating, along with an economical and effective method of manufacture would be desirable. In addition to the improved aesthetics, it would make the surfaces easy to clean and potentially improve scratch resistance due to the lower coefficient of friction.

BRIEF SUMMARY OF THE INVENTION

To reduce the visibility of fingerprints and similar marks an automotive glazing with an AR coating on the interior facing surface, such as a glass roof (monolithic or laminated), an effective and economical method for applying an anti-fingerprint coating over the AR coating has been discovered.

The anti-fingerprint AF coating is comprised of low surface energy silanes which are deposited on the interior face of the large curved glass surface. Application of the coating is performed after bending but can be prior to lamination. The surface of the glass must first be cleaned and then activated by means of a plasma treatment. The coating, in liquid form is applied by any convenient means including but not limited to spray, dip, wipe, roll or evaporation. The coating can also be applied in solid form by evaporation in vacuum. The coating is cured by the application of heat.

Figure 7:
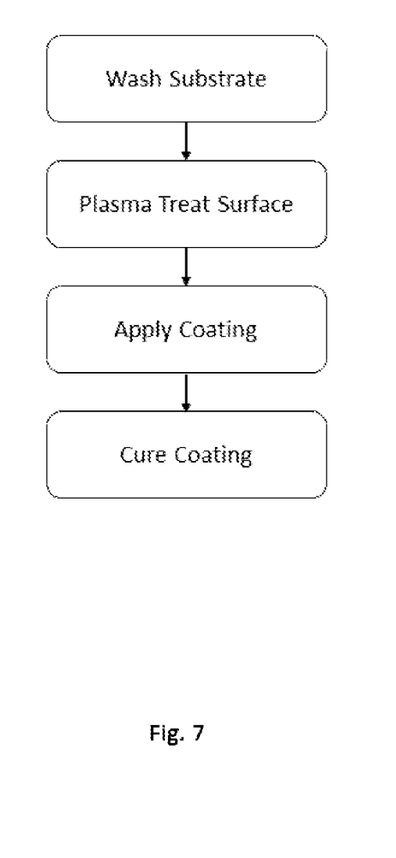

The method of manufacture is comprised of a set of sequential steps illustrated in the flow chart of FIG. 7. The steps commence after the glass is cut to size and thermal bending of the glass has been performed distinguishing this method from other methods of applying an AF coating which are not effective, practical or economical on large curved surfaces.

As a first step, the surface to be coated must be cleaned. The typical automotive glass fabrication glass washer for curved glass parts, utilizing brushes, deionized water and air knifes is one practical means which may be used. It is important to remove any foreign residue from the surface to facilitate a good uniform bond.

Next the surface must be activated. A plasma treatment is used for this. The plasma treatment can be applied by means of hard tooling constructed so as to convey the treatment head across the curved surface. A general-purpose light duty robot is another effective means of applying the plasma treatment.

The coating itself is comprised of a solution containing low surface-energy polysiloxanes. Generally, perfluoro silanes are used such as, but not limited to, polymerized perfluorooctadecyldimethyltrihydroxy silane, heptadecafluorodecyltrimethoxy silane. Silanes are silicon analogs of the carbon-based alkanes. Silane, the analog of methane, is an inorganic compound with chemical formula, SiH4, making it a group 14 hydride. It is a colorless gas. Functional silanes are chemical compounds with four substituents on silicon, in which at least one of these substituents are chemical groups responsible for carrying the desired hydrophobic/olephobic property. Generally, at least 8 carbons (octyl) in the functional group are necessary for hydrophobic and oleophobic performance. The remaining groups define the reactivity of the molecule, including an organosilicon compound. Examples of the reactive group include chloro as in trichlorosilane ($SiHCl_3$), methoxy as in tetramethoxysilane ($Si(CH_3O)_4$), and tetraethoxysilane ($Si(OC_2H_5)_4$). The reactive group is essential to the hydrolysis step, forming silanol groups ($Si(OH)_4$), which opens the reaction path to binding to the hydroxyl-rich glass surface and concomitantly, to the polymerization of the silanol, forming the polysiloxane. The reactive group also defines the reaction kinetics yielding faster hydrolysis steps and coating curing. There are numerous members of the silanes family that can be used. Silanes are commonly used as a precursor for depositing silicon in the semiconductor and photo-voltaic industries.

After application to the glass substrate, the coating must be cured by heating. As an example, one specific formulation required heating into the range of 50° C. to 150° C. for a period ranging from 10 minutes to 12 hours. The exact temperature and duration will depend upon several factors including the formulation used, the heating means, humidity, air flow and others. Convective heating has been found to be particularly effective although other means such as radiant may be used without departing from the intent of the method.

The method may be integrated with the bending process. The surface of the glass substrate is cleaned adequately prior to thermal bending. If anything, the glass surface emerges even cleaner than when it enters the bending process as the heat will tend to burn of any remaining organic residue on the surface. In the case of a laminated glazing, the glass is slowly cooled to anneal the glass upon exit from the thermal bending portion of the process. In the case of a tempered glazing, the glass is rapidly cooled. In either case, the coating can easily be applied and cured. The residual and waste heat from the bending process may be used to further increase the efficiency and economics of the prosses. This integrated method leverages the investment already made in glass handling equipment and floor space. Most bending processes will have a queue that the bent glass will remain in for some period prior to exiting the process. This queue can be modified for the application of the coating.

Alternately, the method can be practiced as a separate off-line process as may be desirable when the application is a value-added option and the customer is supplied with a mix of the same parts with and without the AF coating. Any means that employs the steps of the method does not depart from the intent of the invention.

Likewise, the unique article of manufacture, produced by this method is also claimed as a part of this application.

Figure 4:
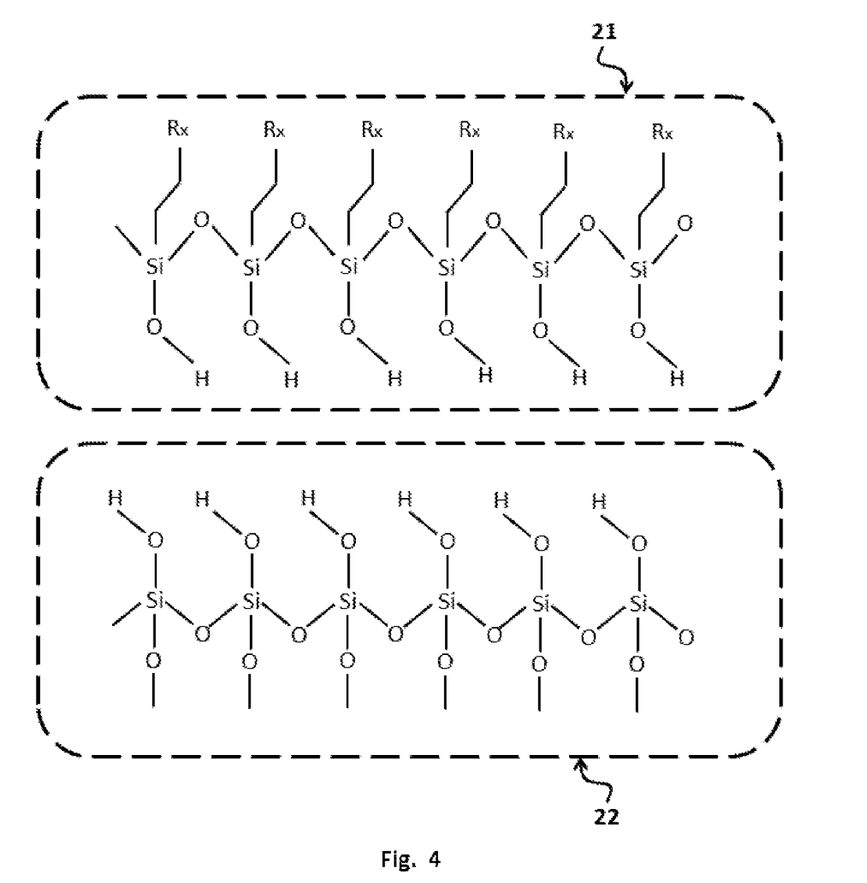
Figure 5:
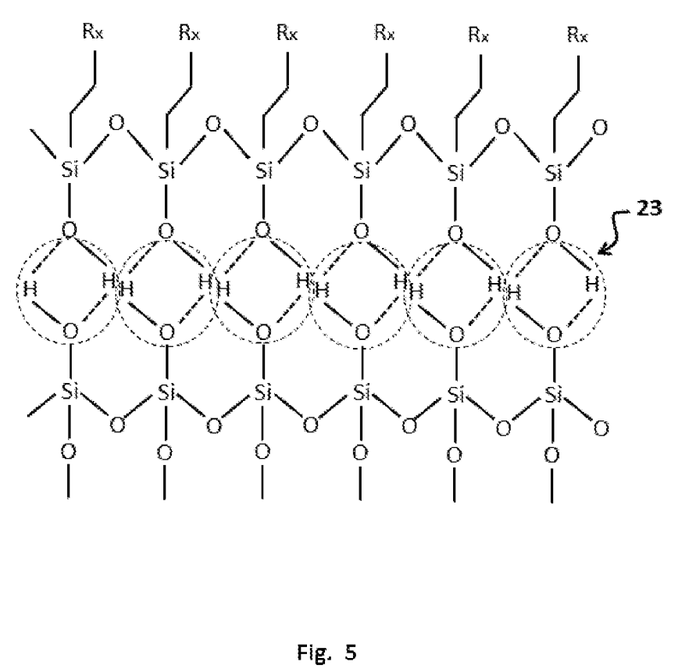
Figure 6:
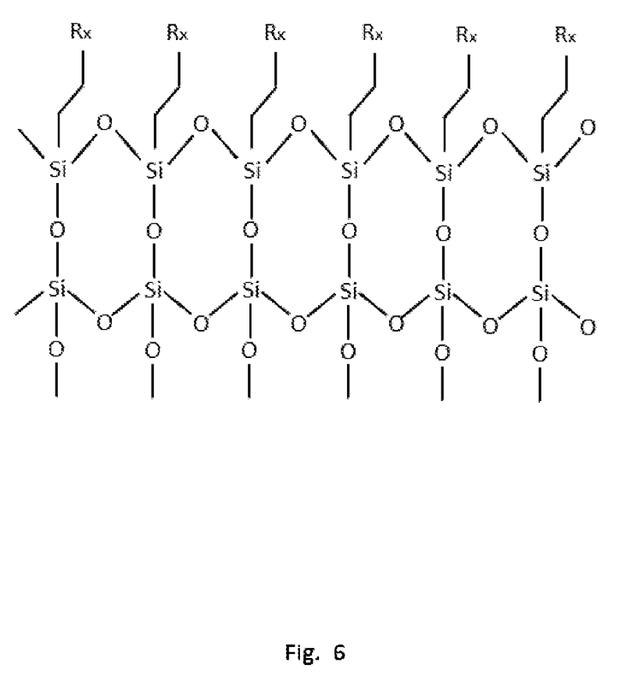

The chemistry of the coating process is illustrated in FIGS. 4, 5 and 6. In FIG. 4 we see the surface of the activated glass substrate and the coating prior to curing. As various members of the silanes family may be used, they are shown as Rx in the Figures. Numerous OH receptors are present at the surface of the substrate. The coating also has OH groups. In FIG. 5 the OH groups on the surface and coating are shown to undergo a chemical reaction in which one water molecule is produced as each pair of molecules on the surface of the substrate and in the coating react. The cured coating is shown in FIG. 6. The weak hydrogen bonds have been replaced by Si—O bonds. As the cured coating is transparent and the thickness can be measured in molecules there is little if any impact on the optical quality of the glazing.

Advantages

Improved aesthetics
Easier to clean
Improved scratch resistance
Hydrophobic
Oleophobic
High lubricity

BRIEF DESCRIPTION OF THE SEVERAL VIEWS OF THE DRAWINGS

| | |
|---|---|
| 1A | Cross section: typical laminated automotive glazing |
| 1B | Cross section: typical laminated automotive glazing with performance film |
| 1C | Cross section: typical tempered monolithic automotive glazing |
| 2 | Exploded view: Panoramic Tempered Glass Roof |
| 3 | Exploded view: Panoramic Laminated Glass Roof |
| 4 | Coating Chemistry: coating and substrate |
| 5 | Coating Chemistry: OH Reactions |
| 6 | Coating Chemistry: Cured Coating |
| 7 | Method Flow Chart |

REFERENCE NUMERALS OF DRAWINGS

| | |
|---|---|
| 2 | Glass |
| 4 | Bonding/Adhesive Layer (interlayer) |
| 6 | Obscuration/Black Frit |
| 12 | Film |
| 18 | Coating |
| 21 | Silanes Coating |
| 22 | Surface of Glass Substrate |
| 23 | Water Molecule |
| 41 | Anti-reflective coating |
| 42 | Anti-fingerprint coating |
| 44 | Performance Film |
| 101 | Surface one |
| 102 | Surface two |
| 103 | Surface three |
| 104 | Surface four |
| 201 | Outer layer |
| 202 | Inner layer |

DETAILED DESCRIPTION OF THE INVENTION

The following terminology is used to describe the glazing of the invention.

A panoramic roof is a vehicle roof glazing which comprises a substantial area of the roof over at least a portion of both the front and rear seating areas of the vehicle. A panoramic roof may be comprised of multiple glazings and may be laminated or monolithic.

The steps of the method must be executed in the order show, however, additional steps which may be required depending upon the specific glazing and coating may not be shown as well as additional steps which may be optional. The steps must be performed sequentially but are not required to be performed immediately after each other and execution of said steps can be separated in space and time. As an example, the cleaning step of the method may be performed prior to the printing of the black frit and thermal bending if no unwanted matter is deposited on the glass surface prior to entering the surface activation step of the method. The coating may be applied and dried rather than cured with the curing taking place at some other step in the process such as at some point during the lamination process where the glazing will be subject to heat.

Figure 1A:
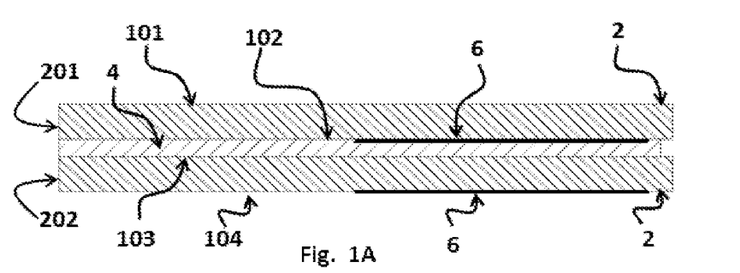
Figure 1B:
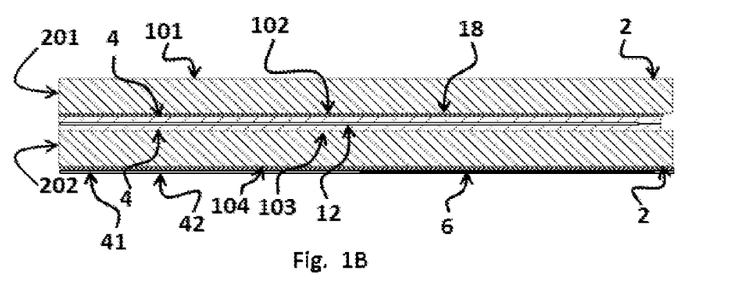

Typical automotive laminated glazing cross sections are illustrated in FIGS. 1A and 1B. A laminate is comprised of two layers of glass, the exterior or outer, 201 and interior or inner, 202 that are permanently bonded together by a plastic layer 4 (interlayer). In a laminate, the glass surface that is on the exterior of the vehicle is referred to as surface one 101 or the number one surface. The opposite face of the exterior glass layer 201 is surface two 102 or the number two surface. The glass 2 surface that is on the interior of the vehicle is referred to as surface four 104 or the number four surface. The opposite face of the interior layer of glass 202 is surface three 103 or the number three surface. Surfaces two 102 and three 103 are bonded together by the plastic layer 4. An obscuration 6 may be also applied to the glass. Obscurations are commonly comprised of black enamel frit printed on either the number two 102 or number four surface 104 or on both. The laminate may have a coating 18 on one or more of the surfaces. The laminate may also comprise a film 12 laminated between at least two plastic layers 4.

Figure 1C:
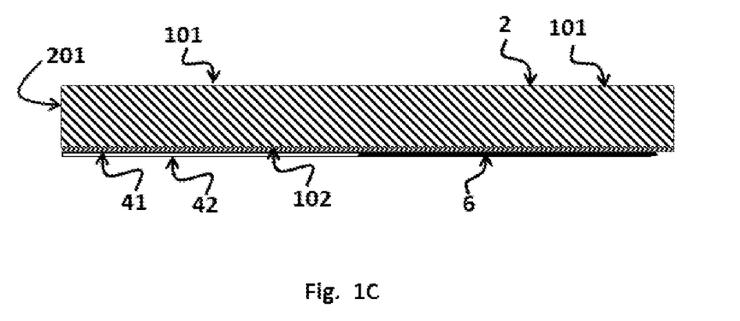

FIG. 1C shows a typical tempered automotive glazing cross section. Tempered glazing is typically comprised of a single layer of glass 201 which has been heat strengthened. The glass surface that is on the exterior of the vehicle is referred to as surface one 101 or the number one surface. The opposite face of the exterior glass layer 201 is surface two 102 or the number two surface. The number two surface 102 of a tempered glazing is on the interior of the vehicle. An obscuration 6 may be also applied to the glass. Obscurations are commonly comprised of black enamel frit printed on the number two 102 surface. The glazing may have a coating 18 on the number one 101 and/or number two 102 surface.

FIGS. 1B and 1C show the anti-reflective and anti-fingerprint coatings of the invention. In FIG. 1B, a laminated cross section, the AR coating 41 is applied to the number four surface 104 of the inner glass layer 202. The black frit 6 is printed over the AR coating 41. The AF coating 42 is applied over the AR coating and the black frit 6. In FIG. 1C, the monolithic tempered cross section, the AR coating 41 is applied to the number two surface 102 of the vehicle interior face of the single glass layer 201. The black frit 6 is printed over top of the AR coating 41. The AF coating 42 is applied over the AR coating and the black frit 6.

The term "glass" can be applied to many organic and inorganic materials, include many that are not transparent. For this document we will only be referring to nonorganic transparent glass. From a scientific standpoint, glass is defined as a state of matter comprising a non-crystalline amorphous solid that lacks the ordered molecular structure of true solids. Glasses have the mechanical rigidity of crystals with the random structure of liquids.

Glass is formed by mixing various substances together and then heating to a temperature where they melt and fully dissolve in each other, forming a forming a miscible homogeneous fluid.

The types of glass that may be used include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent. The glass layers may be comprised of heat absorbing glass compositions as well as infrared reflecting and other types of coatings.

Most of the glass used for containers and windows is soda-lime glass. Soda-lime glass is made from sodium carbonate (soda), calcium carbonate (lime), dolomite, silicon dioxide (silica), aluminum oxide (alumina), and small quantities of substances added to alter the color and other properties.

Borosilicate glass is a type of glass that contains boric oxide. It has a low coefficient of thermal expansion and a high resistance to corrosive chemicals. It is commonly used to make light bulbs, laboratory glassware, and cooking utensils.

Aluminosilicate glass is made with aluminum oxide. It is even more resistant to chemicals than borosilicate glass and it can withstand higher temperatures. Chemically tempered Aluminosilicate glass is widely used for displays on smart phones and other electronic devices.

Lithium-Aluminosilicate is a glass ceramic that has very low thermal expansion, optical transparency and high. It typically contains 3-6% Li2O. It is commonly used for fireplace windows, cooktop panels, lenses and other applications that require low thermal expansion.

A wide range of coatings, used to enhance the performance and properties of glass, are available and in common use and be used in the production of the glazing of the invention. These include but are not limited to anti-reflective, hydrophobic, hydrophilic, self-healing, self-cleaning, anti-bacterial, anti-scratch, anti-graffiti, anti-fingerprint and anti-glare.

Methods of coating application include Magnetron Sputtered Vacuum Deposition (MSVD) as well as others known in the art that are applied via pyrolytic, spray, chemical vapor deposition (CVD), dip, sol-gel and other methods.

The glass layers are formed using gravity bending, press bending, cold bending or any other conventional means known in the art. In the gravity bending process, the glass flat is supported near the edge of glass and then heated. The hot glass sags to the desired shape under the force of gravity. With press bending, the flat glass is heated and then bent on a full of partial surface mold. Air pressure and vacuum is often used to assist the bending process. Gravity and press bending methods for forming glass are well known in the art and will not be discussed in detail in the present disclosure.

The AF coated substrate of the invention may be formed by the method of cold bending. Cold bending is a relatively new technology. As the name suggest, the glass is bent, while cold to its final shape, without the use of heat. On parts with minimal curvature a flat sheet of glass can be bent cold to the contour of the part. This is possible because as the thickness of glass decreases, the sheets become increasingly more flexible and can be bent without inducing stress levels high enough to significantly increase the long-term probability of breakage. Thin sheets of annealed soda-lime glass, in thicknesses of about 1 mm, can be bent to large radii cylindrical shapes (greater than 6 m). When the glass is chemically, or heat strengthened the glass can endure much higher levels of stress and can be bent along both major axis. The process is primarily used to bend chemically tempered thin glass sheets ($\Leftarrow$1 mm) to shape.

Cylindrical shapes can be formed with a radius in one direction of less than 4 meters. Shapes with compound bend, that is curvature in the direction of both principle axis can be formed with a radius of curvature in each direction of as small as approximately 8 meters. Of course, much depends upon the surface area of the parts and the types and thicknesses of the substrates.

The cold bent glass will remain in tension and tend to distort the shape of the bent layer that it is bonded to. Therefore, the bent layer must be compensated to offset the tension. For more complex shapes with a high level of curvature, the flat glass may need to be partially thermally bent prior to cold bending.

The glass to be cold bent is placed with a bent to shape layer and with a bonding layer placed between the glass to be cold bent and the bent glass layer. The assembly is placed in what is known as a vacuum bag. The vacuum bag is an airtight set of plastic sheets, enclosing the assembly and bonded together it the edges, which allows for the air to be evacuated from the assembly and which also applies pressure on the assembly forcing the layers into contact. The assembly, in the evacuated vacuum bag, is then heated to seal the assembly. The assembly is next placed into an autoclave which heats the assembly and applies high pressure. This completes the cold bending process as the flat glass at this point has conformed to the shape of the bent layer and is permanently affixed. The cold bending process is very similar to a standard vacuum bag/autoclave process, well known in the art, except for having an unbent glass layer added to the stack of glass.

The plastic bonding layer 4 (interlayer) has the primary function of bonding the major faces of adjacent layers to each other. The material selected is typically a clear thermoset plastic.

For automotive use, the most commonly used bonding layer 4 (interlayer) is polyvinyl butyral (PVB). PVB has excellent adhesion to glass and is optically clear once laminated. It is produced by the reaction between polyvinyl alcohol and n-butyraldehyde. PVB is clear and has high adhesion to glass. However, PVB by itself, it is too brittle. Plasticizers must be added to make the material flexible and to give it the ability to dissipate energy over a wide range over the temperature range required for an automobile. Only a small number of plasticizers are used. They are typically linear dicarboxylic esters. Two in common use are di-n-hexyl adipate and tetra-ethylene glycol di-n-heptanoate. A typical automotive PVB interlayer is comprised of 30-40% plasticizer by weight.

Interlayers are available with enhanced capabilities beyond bonding the glass layers together. The invention may include interlayers designed to dampen sound. Such interlayers are comprised whole or in part of a layer of plastic that is softer and more flexible than that normally used. The interlayer may also be of a type which has solar attenuating properties.

A wide variety of films are available that can be incorporated into a laminate. The uses for these films include but are not limited to: solar control, variable light transmission, increased stiffness, increased structural integrity, improved penetration resistance, improved occupant retention, providing a barrier, tint, providing a sunshade, color correction, and as a substrate for functional and aesthetic graphics. The term "film" shall include these as well as other products that may be developed or which are currently available which enhance the performance, function, aesthetics or cost of a laminated glazing. Most films do not have adhesive properties. To incorporate into a laminate, sheets of plastic interlayer are needed on each side of the film to bond the film to the other layers of the laminate.

DESCRIPTION OF EMBODIMENTS

Figure 2:
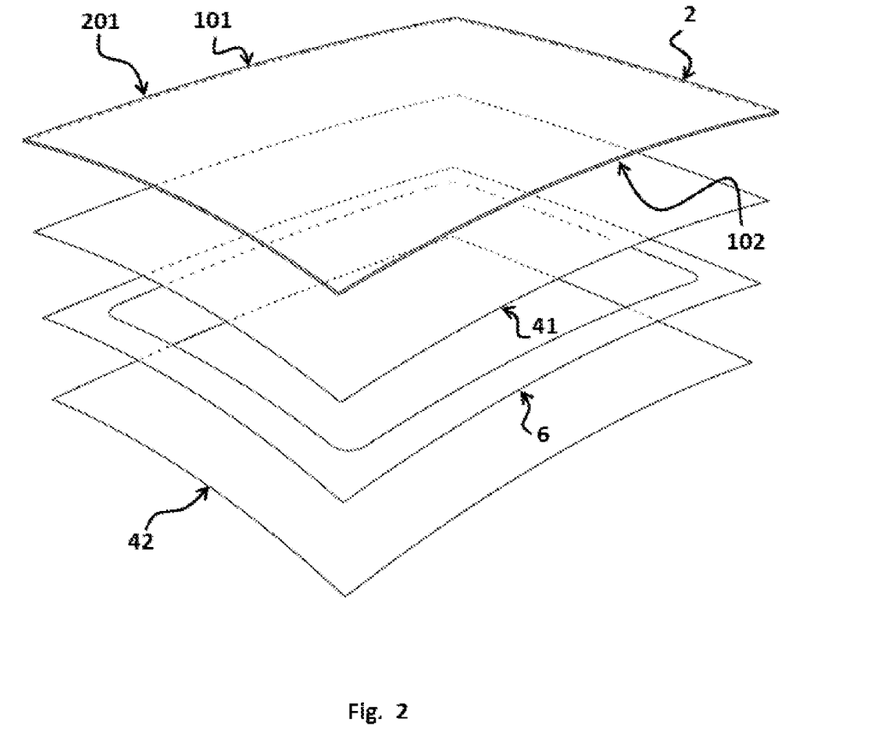

1. Embodiment one, illustrated in FIG. 2, is a large, thermally tempered, 4 mm thick, dark solar green soda-lime glass monolithic glass panoramic roof with a total visible light transmission of less than 20%. The flat 4 mm glass is coated with an MSVD layered anti-reflective (AR) coating 41 with total visible light reflection of less than 2% on the surface two 102, preferably less than 1%. The glass substrate is cut to size and cleaned. A black frit 6 is printed over the AR coating. The flat glass 201 is heated, bent and tempered. At the exit of the bending process, the glass enters an in-line process where the AF coating 42 is applied. The surface two 102 of the bent glass passes through a plasma surface activation system. In the next step, a solution of perfluoro low surface energy silanes, such as (tridecafluoro-1,1,2,2-tetrahydrooctyl)trimethoxysilane or (heptadecafluoro-1,1,2,2-tetrahydrodecyl)trimethoxysilane, is atomized and sprayed onto the surface two 102 and allowed to settle forming a uniform wet layer. Next, convective heat is used to heat the glass into the range of 80° C.-150° C. where the glass is held for 30 minutes. The heat cures the coating and completes the process.

Figure 3:
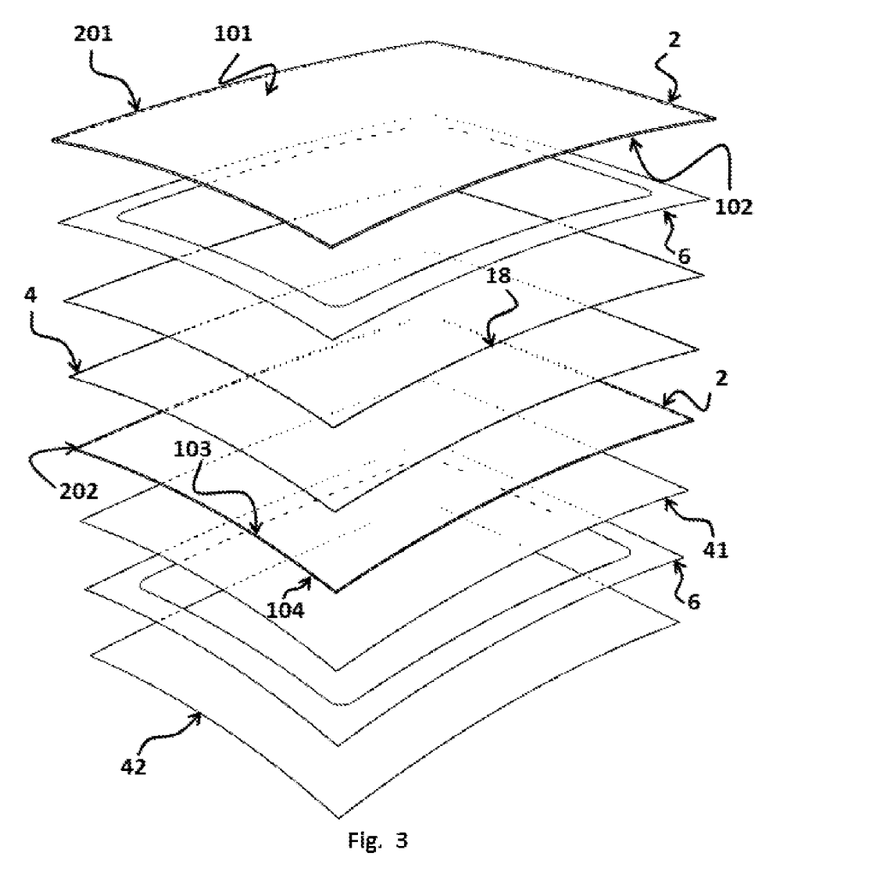

2. Embodiment two, illustrated in FIG. 3, is a large, laminated soda-lime glass panoramic roof. The total visible light transmission of the finished laminate less than 10%, preferably less than 5%. The outer glass layer 201 is comprised of 2.4 mm thick ultra-clear soda-lime glass. A black frit 6 is screen printed on the surface two 102 and fired. The flat glass layer 201 is then coated with a triple silver MSVD applied solar coating 18 on the surface two 102.

A 2.1 mm thick soda-lime solar green inner glass layer 202 is coated with an MSVD anti-reflective coating 41 with total visible light reflection of less than 2% on the surface four 104, preferably less than 1%. The glass substrate is cut to size and washed. A black frit 6 is printed over the AR coating 41.

The flat glass layer 201, 202 are heated, gravity bent and annealed. At the exit of the bending process, the inner glass layer 202 enters an in-line process where the AF coating 42 is applied. The surface four 104 of the bent glass passes through a plasma surface activation system. In the next step, a solvent-based solution of low surface energy silanes such as (tridecafluoro-1,1,2,2-tetrahydrooctyl)trimethoxysilane or (heptadecafluoro-1,1,2,2-tetrahydrodecyl)trimethoxysilane is atomized, sprayed onto the surface four 104 and allowed to settle forming a uniform wet layer. Next, convective heat is used to heat the glass into the range of 80° C.-150° C. where the glass is held for 30 minutes. The heat cures the coating and completes the process. After this, the two glass layers 201, 202 are laminated with an 0.76 thick dark tint PVB interlayer 4.

3. Embodiment three, similar to the embodiment depicted in FIG. 3, is a large, laminated glass panoramic roof. The total visible light transmission of the finished laminate less than 5%. The outer glass layer 201 is comprised of 2.4 mm thick ultra-clear soda-lime. A black frit is screen printed on the surface two 102 and fired. The flat glass layer 201 is then coated with a triple silver MSVD applied solar coating 18 on the surface two 102. The outer flat glass layer 201 is heated, gravity bent and annealed.

The inner glass layer 202 is not printed with a black frit. The inner glass layer 202 is comprised of a 0.7 mm thick alumina silicate which has been chemically tempered. The inner glass 202 layer is first coated with an MSVD anti-reflective coating 41 with total visible light reflection of less than 2% on the surface four 104. The glass then enters an in-line process where the AF coating 42 is applied. The surface four 104 of the flat glass passes through a plasma surface activation system. In the next step, a solvent-based solution of low surface energy silanes such as (tridecafluoro-1,1,2,2-tetrahydrooctyl)trimethoxysilane or (heptadecafluoro-1,1,2,2-tetrahydrodecyl)trimethoxysilane, is atomized, sprayed onto the surface four 104 and allowed to settle forming a uniform wet layer. Next, convective heat is used to heat the glass into the range of 120° C.-150° C. where the glass is held for 30 minutes. The heat cures the coating and completes this step of the process.

The two glass layers 201, 202 are laminated with an 0.76 thick dark tint PVB interlayer 4. The flat unbent inner glass layer 202 is cold bent to the bent outer glass layer 201 during the lamination process.

4. Embodiment four, similar to the embodiment depicted in FIG. 3, is a large, laminated glass panoramic roof. The total visible light transmission of the finished laminate less than 5%. The outer glass layer 201 is comprised of 2.4 mm thick ultra-clear soda-lime. A black frit 6 is screen printed on the surface two 102 and fired. The flat glass layer 201 is then coated with a triple silver MSVD applied solar coating 18 on the surface two 102. The outer flat glass layer 201 is heated, gravity bent and annealed.

The inner glass layer 202 is comprised of 2.1 mm thick soda-lime solar green inner glass layer which is first coated with an MSVD anti-reflective coating 41 with a total visible light reflection of less than 2% on the surface four 104. The inner flat glass layer 202 is heated and gravity bent.

The glass then enters an in-line process where the AF coating 42 is applied. The surface four 104 of the bent glass passes through a plasma surface activation system. In the next step, a solvent-based solution of low surface energy silanes such as (tridecafluoro-1,1,2,2-tetrahydrooctyl)trimethoxysilane or (heptadecafluoro-1,1,2,2-tetrahydrodecyl)trimethoxysilane, is atomized, sprayed onto the surface four 104 and allowed to settle forming a uniform wet layer. The coating is dried through the use of forced air as the glass is annealed and as it exits the bending process. The coating is only partially cured during this step. A hydrolysis reaction takes place but the binding to the surface and further polymerization requires a longer duration and high temperature that required for drying. Once dried, the coated substrate can be further processed without damaging the coating. The cutting is completed during the remainder of the process. The laminate is heated as a normal part of the prelamination and autoclave portions of the method. The heat applied to the laminate assembly during preparation for the autoclave cycle and during the autoclave cycle is sufficient to complete the curing of the coating. This has the advantage of having a processing time that is approximately the same as a non-coated laminate.

What is claimed is:

1. An automotive roof glazing with a total visible light transmission of less than 20%, comprising:
    at least one glass layer having two oppositely disposed major faces, wherein one of these two major faces is an interior face which comprises a portion of the interior surface of a vehicle cabin when installed as a window in a vehicle; and
    an anti-reflective coating applied on the interior face of said at least one glass layer; and
    an anti-fingerprint coating applied on the interior face of said at least one glass layer disposed over the anti-reflective coating;
    wherein the anti-fingerprint coating is a low surface-energy silane-based coating.

2. The automotive roof glazing of claim 1, wherein the glazing is a monolithic tempered glazing.

3. The automotive roof glazing of claim 1, wherein the glazing is a laminated glazing.

4. The automotive roof glazing of claim 1, wherein said at least one glass layer is at least two glass layers, outer glass layer and inner glass layer; wherein the anti-reflective coating is applied on the interior face of the inner glass layer; and wherein the automotive roof glazing further comprises a plastic bonding layer placed between the outer and inner glass layers.

5. The automotive roof glazing of claim 4, wherein the thickness of the inner glass layer is less than 1.0 mm.

6. The automotive roof glazing of claim 4, wherein the inner glass layer is cold bent.

7. The automotive roof glazing of claim 1, wherein the total visible light transmission is less than 10%.

8. The automotive roof glazing of claim 1, wherein the total visible light reflection is less than 2%.

9. The automotive roof glazing of claim 1, wherein the total visible light reflection is less than 1%.

10. A method for producing an automotive roof glazing with a total visible light transmission of less than 20% comprised of a least one glass layer having two oppositely disposed major faces, wherein one of these two major faces is an interior face which comprises a portion of the interior surface of a vehicle cabin when installed as a window in a vehicle; an anti-reflective coating applied on the interior face of said at least one glass layer; and an anti-fingerprint coating disposed over the anti-reflective coating, the method comprising the steps of:
    cleaning the interior face of said at least one glass layer having the anti-reflective coating such that substantially all contaminates, debris and other undesirable elements are removed from said face;
    subjecting the interior face of said at least one glass layer having the anti-reflecting coating to a plasma surface activation treatment;
    applying a low surface-energy silane-based anti-fingerprint coating on at least a portion of the interior face of said at least one glass layer having the anti-reflective coating; and
    heating said at least one glass layer having the anti-reflective coating to a temperature range and for a duration sufficient to cure the anti-fingerprint coating.

11. The method of claim 10, wherein the method is integrated as an in-line part of the glass bending process.

12. The method of claim 10, wherein the step of applying a low surface-energy silane-based anti-fingerprint coating comprises atomizing a solution of low surface-energy silanes via spray means.

13. The method of claim 10, wherein in the step of heating, the temperature range is from 50° C. to 150° C. for a period from 10 minutes to 12 hours.

14. The method of claim 10, wherein the step of applying a low surface-energy silane-based anti-fingerprint coating is carried out after bending said at least one glass layer having the anti-reflective coating.

15. The method of claim 10, wherein the step of applying a low surface-energy silane-based anti-fingerprint coating is carried out before a cold bending process applied to said at least one glass layer having the anti-reflective coating.

\* \* \* \* \*